(12) United States Patent
Molbech et al.

(10) Patent No.: US 7,811,121 B2
(45) Date of Patent: Oct. 12, 2010

(54) FLEXIBLE ELECTRIC POWER CABLE AND WIND TURBINE

(75) Inventors: Allan Laursen Molbech, Lem St (DK); Kim Bertelsen, Ulfborg (DK)

(73) Assignee: Vestas Wind Systems A/S (DK)

( * ) Notice: Subject to any disclaimer, the term of this patent is extended or adjusted under 35 U.S.C. 154(b) by 0 days.

(21) Appl. No.: 12/507,329

(22) Filed: Jul. 22, 2009

(65) Prior Publication Data

US 2009/0284019 A1 Nov. 19, 2009

Related U.S. Application Data

(63) Continuation of application No. PCT/DK2008/000025, filed on Jan. 23, 2008.

(30) Foreign Application Priority Data

Jan. 23, 2007 (DK) ................................ 2007 00101

(51) Int. Cl.
*H01R 11/00* (2006.01)
(52) U.S. Cl. .................... 439/502; 439/877; 439/883
(58) Field of Classification Search .............. 439/502, 439/507, 777, 877, 883
See application file for complete search history.

(56) References Cited

U.S. PATENT DOCUMENTS

| 1,227,726 | A | | 5/1917 | Woodhead |
| 2,930,836 | A | * | 3/1960 | Floyd, Jr. ............... 174/84 C |
| 2,968,788 | A | * | 1/1961 | Neaderland et al. ......... 439/883 |
| 5,573,423 | A | | 11/1996 | Lin et al. |
| 7,048,562 | B2 | | 5/2006 | Lutsch |
| 2002/0027013 | A1 | | 3/2002 | Kondo |
| 2006/0292922 | A1 | | 12/2006 | Froschl |

FOREIGN PATENT DOCUMENTS

| DE | 102005027327 A1 | 1/2007 |
| JP | 60147176 | 9/1985 |
| WO | 2005050008 A1 | 6/2005 |

OTHER PUBLICATIONS

Danish Search Report, Sep. 10, 2007 (1 page).
International Searach Report and Written Opinion of the International Searching Authority, May 13, 2008 (15 pages).

* cited by examiner

*Primary Examiner*—Khiem Nguyen
(74) *Attorney, Agent, or Firm*—St. Onge Steward Johnston & Reens LLC

(57) ABSTRACT

A wind turbine and a flexible electric power cable for transferring electric power in a moving environment are provided. The power cable includes a conductor with a plurality of cores for conducting an electric current and an isolator for protecting the conductor and a connector piece for surrounding and connecting an end of the conductor with one or more apparatuses. The connector piece includes at least two encircling connection areas including one or more electrical connection areas establishing electrical connection between the connector piece and the plurality of cores, the electrical connection areas including one or more through-going connection holes for connecting the connector piece to the one or more apparatuses, and one or more mechanical connection areas establishing mechanical connection between the connector piece and the conductor. The areas are positioned in continuation of each other, separated and connected by one or more adapting sections.

17 Claims, 6 Drawing Sheets

FLEXIBLE ELECTRIC POWER CABLE AND WIND TURBINE

CROSS-REFERENCE TO RELATED APPLICATIONS

The present application is a continuation of pending International patent application PCT/DK/2008/000025 filed on Jan. 23, 2008 which designates the United States and claims priority from Danish patent application PA 2007 00101 filed on Jan. 23, 2007, the content of which is incorporated herein by reference.

FIELD OF THE INVENTION

The invention relates to a flexible electric power cable and a wind turbine.

BACKGROUND OF THE INVENTION

Electric motion equipment often comprises a number of flexible electric power cables for transferring electric power.

An example of an area of use comprises a moving environment is a modern wind turbine wherein the rotating part such as the wind turbine rotor and hub includes a lot of electric motion equipment with accompanying power cables.

The power cables often follow the motions of the electric motion equipment in the wind turbine e.g. continuous forward and backward linear movements. Simultaneously the electric motion equipment and power cables perform a rotating movement with the rotating part. Consequently the cables face linear and rotating forces from the different movements.

A modern power cable usually comprises a conductor surrounded by an isolating cover of a PVC material. The cable is terminated in a cable shoe or a similar connection device in order to be able to connect the cable to the electric motion equipment. The cable shoe is applied with a mechanical force to an end of the cable where the cable end has initially been stripped of isolating cover.

A problem of modern power cables with connection to electric motion equipment is the fact that metal fatigue failure may occur due to the linear and rotational movements. The fatigue failures especially occur at the place of mechanical deformation in the connection between the cable and the cable shoe. Consequently the cables need to be replaced more often than cables just facing forward and backward linear movements.

It is an object of the present invention to provide a flexible electric power cable without the abovementioned problem. Further, it is an object of the present invention to provide a wind turbine with a flexible electric power cable advantageously adapted to the place of use.

SUMMARY OF THE INVENTION

The invention provides a flexible electric power cable for transferring electric power in a dynamic environment, said power cable comprising a conductor with a plurality of cores for conducting an electric current and an isolator for protecting said cores, a connector piece for surrounding and connecting an end of said conductor with one or more apparatuses, wherein said connector piece comprises at least two connection areas including one or more electrical connection areas establishing electrical connection between the connector piece and said plurality of cores and one or more mechanical connection areas establishing mechanical connection between the connector piece and the conductor, wherein said areas further are positioned in continuation of each other and separated, and wherein the cross sections of said one or more mechanical connection areas and the cross sections of said one or more electrical connection areas are of different shapes with one or more adapting sections connecting said connection areas, tightly surrounding the cable all the way between said connection areas.

Hereby it is ensured that the conductor is facing less mechanical stress from vibrations and dynamic loads by establishing a mechanical connection area with an encircling hold on the conductor before the electric connection area i.e. a transitional area before the final electric connection to the connector piece. The transition allows a smooth and gentle connection to be established between the connector piece and the conductor. The suppression of loads is enhanced through the connector piece and the cable is thus able to endure higher dynamic mechanical loads and vibrations e.g. continuous dynamic mechanical loads.

Furthermore, the one or more adapting sections ensure an advantageous transformation from the typically round conductor to the typically four sided end of the connector piece. The transformation ensures that the cable does not break e.g. at the start of connector piece due to fatigue from many movements in different directions. A smooth transformation throughout the whole connector piece is achieved by letting the electrical connection area constitute the connector part with one or more connection holes for connecting the connector piece to one or more apparatuses. In this way, the cores of the cable continue all the way through the connector piece, thus using most of the length of the connector piece for the transformation.

This enables for the possibility of making the connector piece relatively short, which is important for at least two reasons. Firstly and most important, if the power cable is used for conduction of lightning currents, it is important to keep each part of the current path as short as possible, thus keeping the electrical resistance met by the lightning current as small as possible in order to ensure that the predominant part of the current does in fact follow the intended path through the lightning connector on its way to the ground. Secondly, in many applications, space conditions can define limits to the sizes of different components.

Cables with such connector pieces, providing increasing flexibility of the cable from one end of the connector piece to the other, show significantly fewer fractural damages than cables using conventional connector pieces when submitted to similar exhaustion and fatigue tests.

In one aspect of the invention, said electrical connection areas comprise one or more through-going connection holes for connecting said connector piece to said one or more apparatuses.

In a further aspect of the invention, said one or more connection holes perforate the cores of the power cable.

By placing the one or more connection holes in the electrical connection area, preferably through the cores of the cable, it is ensured, that the current has the shortest possible way from the contact surface to the cable itself.

In one aspect of the invention, said isolator continues all the way through at least one mechanical connection area. Hereby is ensured a maximum strength of the mechanical connection between the isolator of the cable and at least one mechanical connection area of the connector piece.

In one aspect of the present invention said isolator is made in an insulating moulding material with said plurality of cores being moulded into the material e.g. a moulding material of silicone. The isolator is a softer material in comparison with the plurality of cores and consequently the mechanical connection area and the conductor together function as a spring which suppresses vibration forces before reaching the subsequent electrical connection area with the very rigid hold on the conductor cores by crimping.

The use of a moulded isolator allows a more controlled transition in the mechanical connection area.

In one aspect of the present invention said plurality of cores and the isolator establish a circular cross section of said conductor.

In one aspect of the present invention a cross section of a mechanical connection area is of a circular shape and a cross section of an electrical connection area is of a substantially four-sided shape. A circular shape of the mechanical connection area corresponds to the shape of most cables, and a substantially four-sided shape, such as a rectangular shape, of the electrical connection area is preferable, since in a preferred embodiment of the invention, an electrical connection area constitutes a part of the connector piece that is supposed to be mounted against a typically plane surface of an apparatus.

It should be noted that connectors having a circular section and a section with a substantially four-sided shape, the two sections being connected by an adapting section, are well-known from the art. In these connectors, however, the circular section constitutes the area of electrical connection as well as of mechanical connection unlike the connector piece according to the present invention, where said areas of electrical and mechanical connection, resp., are positioned in continuation of each other and separated.

In one aspect of the present invention, an adapting section has a circular shape corresponding to the shape of a mechanical connection area at one end and a four-sided shape corresponding to the shape of an electrical connection area at the other end. Hereby it is ensured that the transition from a circular shape to the four-sided shape is as less stressful as possible by supporting the cable maximally throughout the connector piece.

In one aspect of the present invention the core diameter is less than 0.5 millimeters e.g. a single core diameter of 0.1 millimeters. Hereby it is achieved that the cable has an increased flexibility due to the small core diameter and thus higher number of cores in the cable. The cores with a smaller diameter in a cable according to the invention are less likely to break in comparison with more rigid cores of a larger diameter.

In one aspect of the present invention the cross section of the cable is more than 20 square millimeters e.g. a cross section of 50 square millimeters. Hereby it is ensured that the cable is able to handle and stand currents of up to at least 200 kA, which can be expected to pass through the cable if it used in relation to a lightning conduction system.

In one aspect of the present invention the front of the electrical connection area is sealed with a zinc or similar electric conductive metal material. Hereby it is ensured that any capillary effects are avoided at the front of the electrical connection area making the cable waterproof.

In one aspect of the present invention, the mechanical connection area toward the conductor starts with a trumpet shaped protective cap.

In one aspect of the present invention, the mechanical and/or electrical connection areas are established by a crimping process.

Before the crimping process, the isolator is removed from one end of a power cable, and the uninsulated end is inserted into a cylindrical casing.

By the term "crimping process" is meant a process comprising the step of pressing together one end of the casing (the four-sided rigid electrical connection area) using a large force, whereby an adapting section with its characteristic shape (four-sided in one end, circular in the other) is formed, because the other end of the casing is kept in its circular shape.

Before the crimping process begins, the casing has been provided with a small "collar" at the end through which the cable is inserted in order to avoid a sharp edge at the entrance of the cable. The isolator of the cable is inserted all the way to but not into the part being pressed together to form the rigid part in order to ensure that the gradual transformation from one shape to another provided by the adapting section is optimized.

After the crimping process has been completed, a connection hole can be drilled through the rigid part, whereby the shortest possible current path from the contact surface to the cable is ensured.

The advantage of this method as compared with known methods is exactly that the current is transferred from the contact surface to the cable itself in the most efficient way. Using normal methods, the current most be transferred through some relatively small contact flaps to a relatively small number of cores of the cable.

In a further aspect of the invention, a mechanical connection area, an electrical connection area and an adapting section are manufactured as one integral unit constituting a casing tightly surrounding the cable all the way through the connector piece. Hereby is ensured a maximum support of the cable on its way through the connector piece.

The invention also relates to a wind turbine comprising a stationary part including the wind turbine tower and nacelle a rotating part including the wind turbine rotor and hub wherein at least one flexible electric power cable as described above connects wind turbine apparatus in the rotating part in order to transfer electric power.

In an aspect of the present invention said flexible electric power cable is part of the lightning protection or pitch control systems as positioned in the wind turbine hub e.g. transferring the electric power of electric lightning or supply currents.

In an aspect of the present invention said flexible electric power cable is free hanging beyond the connections at one or more connection pieces.

BRIEF DESCRIPTION OF THE DRAWINGS

The invention will be described in the following with reference to the figures in which.

DETAILED DESCRIPTION OF THE INVENTION

Figure 1:
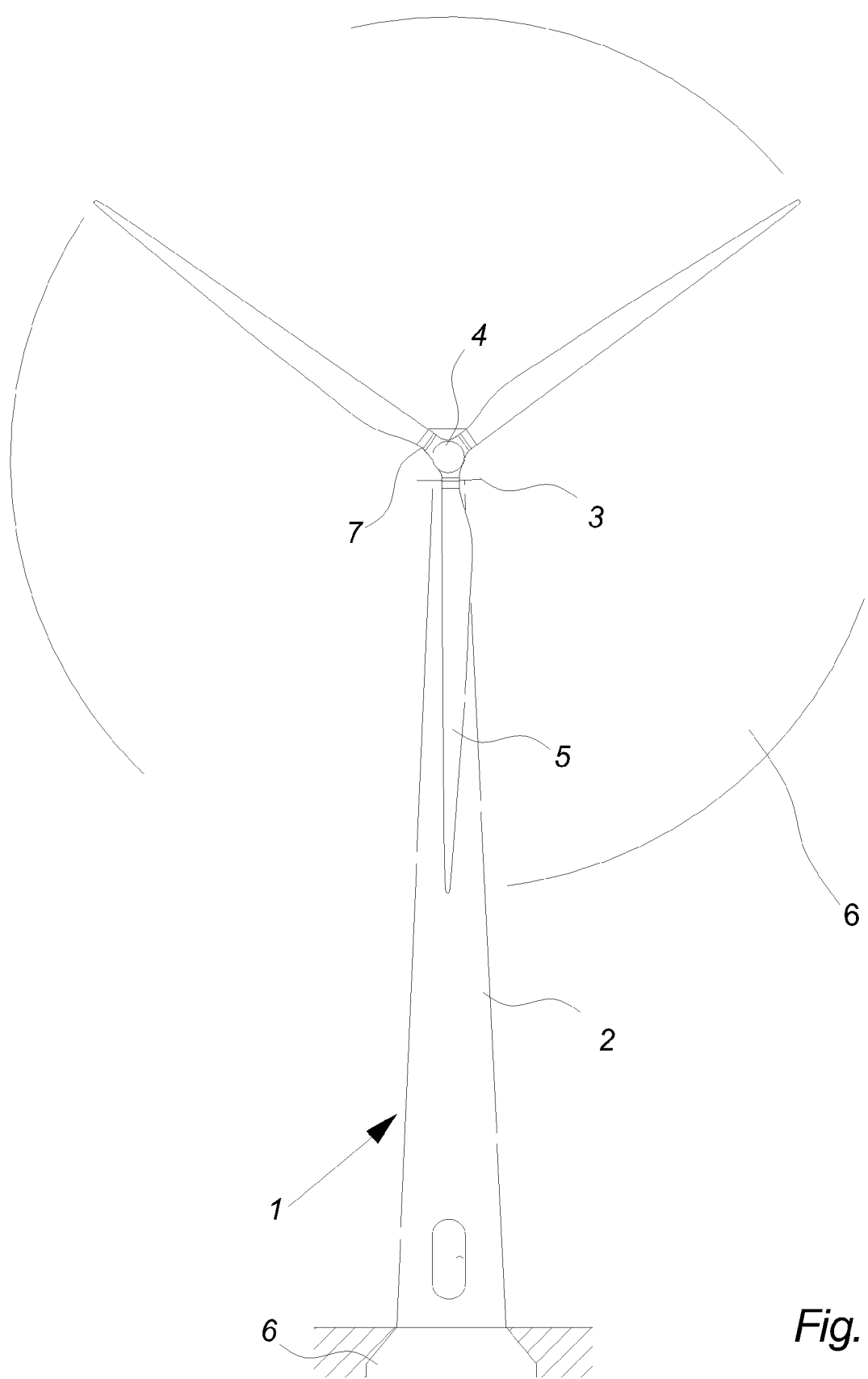
FIG. 1 illustrates a front view of a large modern wind turbine.

FIG. 1 illustrates a front view of a modern wind turbine 1 with a tower 2 positioned on a foundation 8. A wind turbine nacelle 3 and hub 4 is positioned on top of the tower.

The wind turbine rotor 6, comprising at least one blade such as three wind turbine blades 5 as illustrated, is connected to the wind hub 4 through pitch mechanisms 7. Each pitch mechanism includes a blade bearing and pitch actuating means which allows the blade to pitch.

Figure 2:
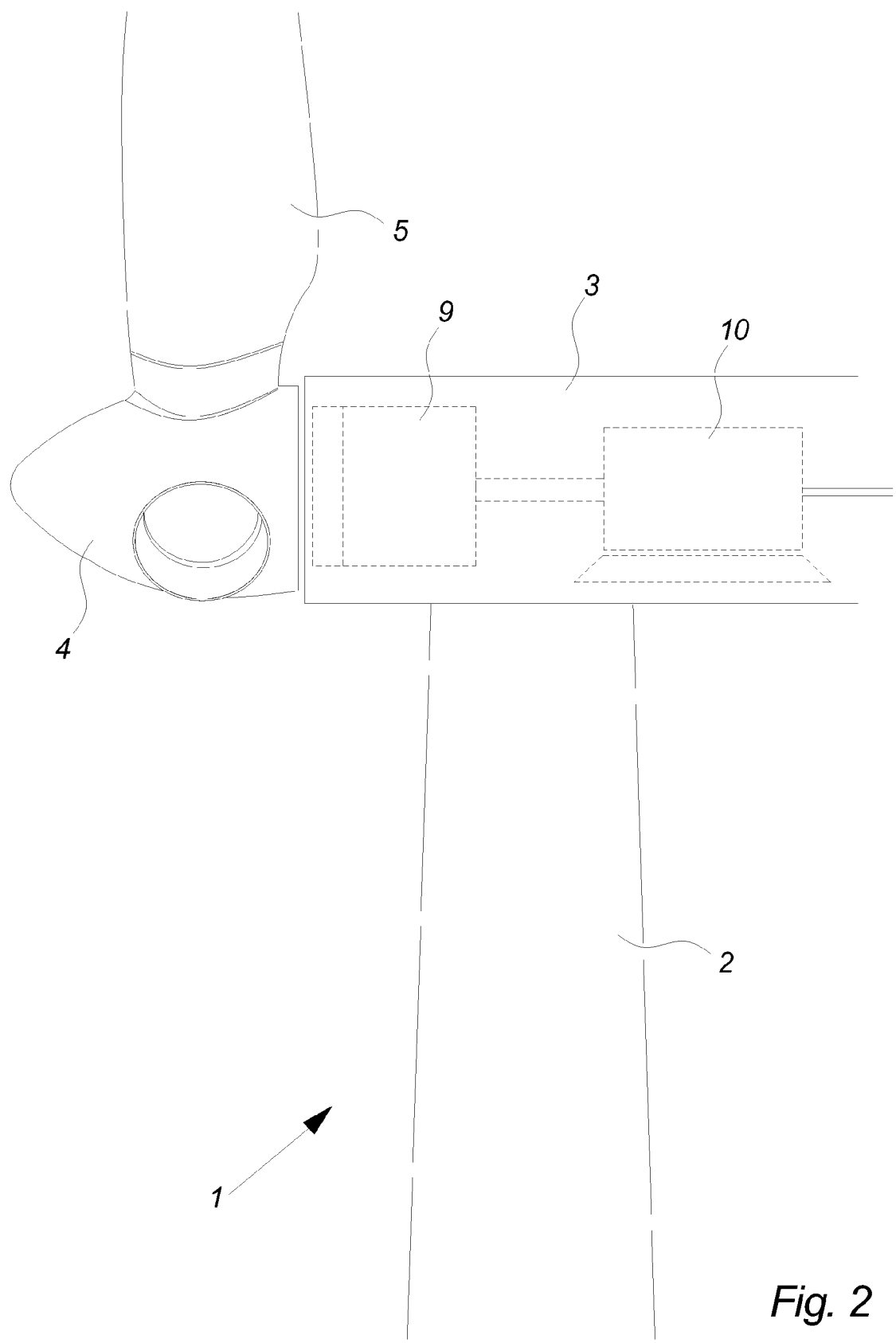
FIG. 2 illustrates schematically the wind turbine seen from the side and with different wind turbine components.

FIG. 2 illustrates schematically the wind turbine seen from the side and with different wind turbine components. Wind turbine components connected directly to the nacelle 3 include the wind turbine hub 4, the gearbox 9 and the generator 10 illustrated with an electric connection to a utility grid.

Figure 3B:
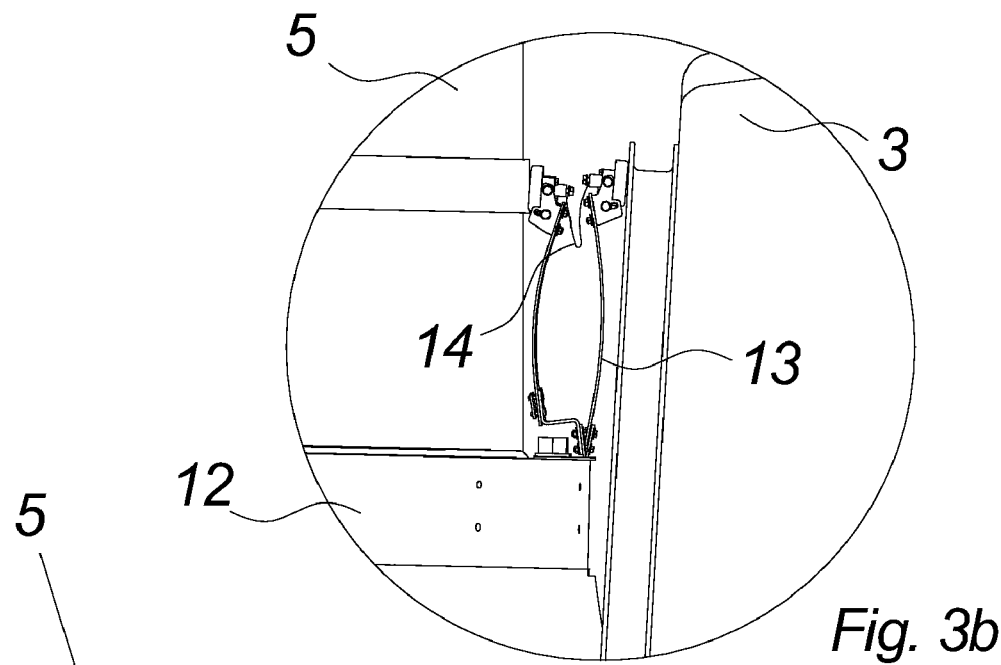
FIGS. 3a and 3b illustrate different places of use within the rotating part of a wind turbine
Figure 3A:
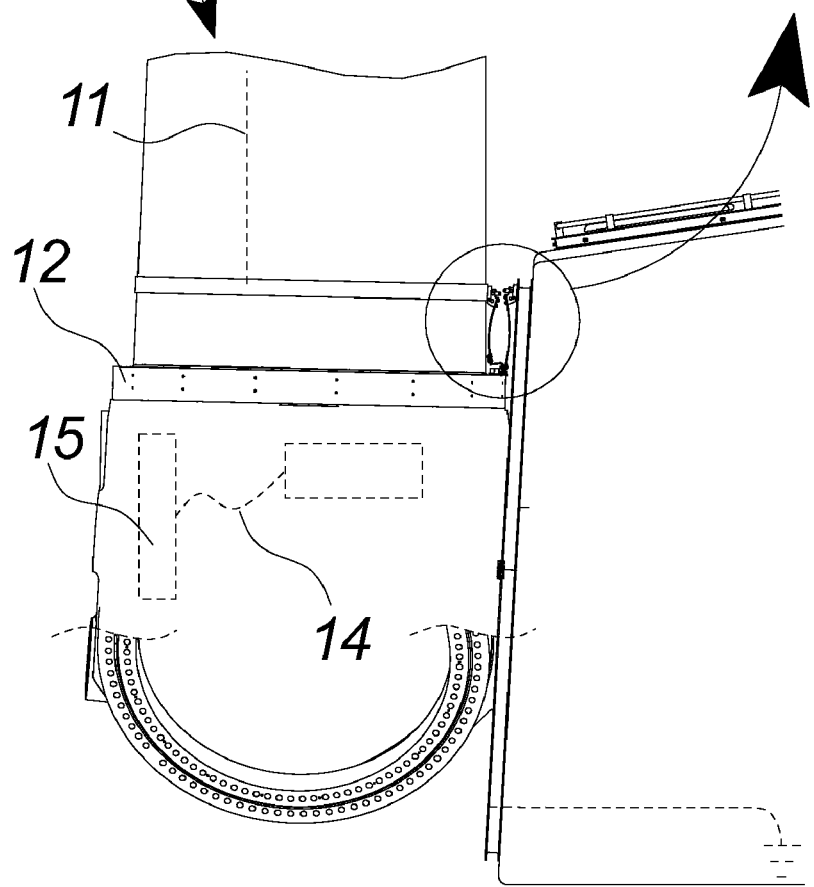

FIG. 3a illustrates two places of use for a flexible electric cable according to the invention within the rotating part of a wind turbine.

The first place of use includes a transfer by a lightning connection means 13 establishing electric contact between a rotating and a stationary section of a lightning protection system. The rotating part may be a metal band on the outer surface of a wind turbine blade with an electric connection to the internal down conductor of the blade. The stationary part may be a circular metal surface on the front of the wind turbine nacelle. The lightning connection means comprises two pads in relation to the rotating and stationary part of the lightning protection system. Each pad is positioned at the ends of flexible force transferring means which are connected to a base plate. The base plate of the lightning connection means is mounted on a section of the flange of the wind turbine blade inside the hub. A flexible electric power cable is used in order to establish an electric connection between the two pads and to transfer the lightning current from the rotating part to the stationary part of the lightning protection system and subsequently to a ground potential.

The second place of use includes a pitch control system 15 wherein control means of a blade pitch cylinder is connected to a control cabin with a flexible electric power cable.

FIG. 3b illustrates an enlargement of the lightning connection means which is further disclosed in international patent application no. WO 2005/050008 A1. The subject matter of the international patent application is hereby incorporated in the present application by reference.

The pads of the lightning connection means and the control means of the blade pitch cylinder may perform while being part of the rotating part of the wind turbine.

Figure 4A:
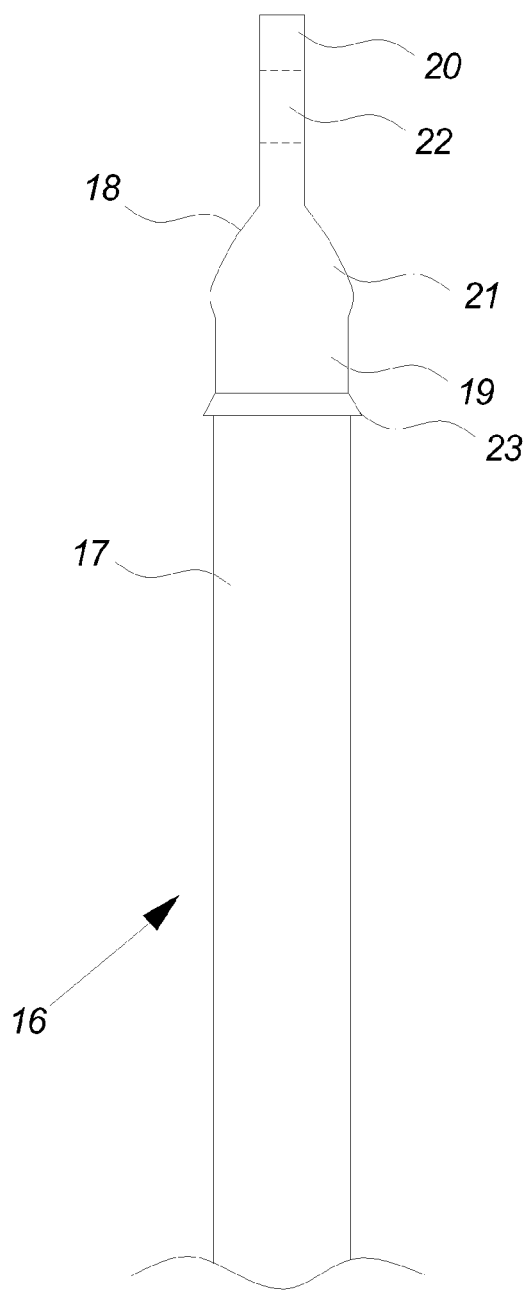
FIGS. 4a and 4b illustrate two side views of a preferred embodiment of a flexible electric power cable according to the invention.
Figure 4B:
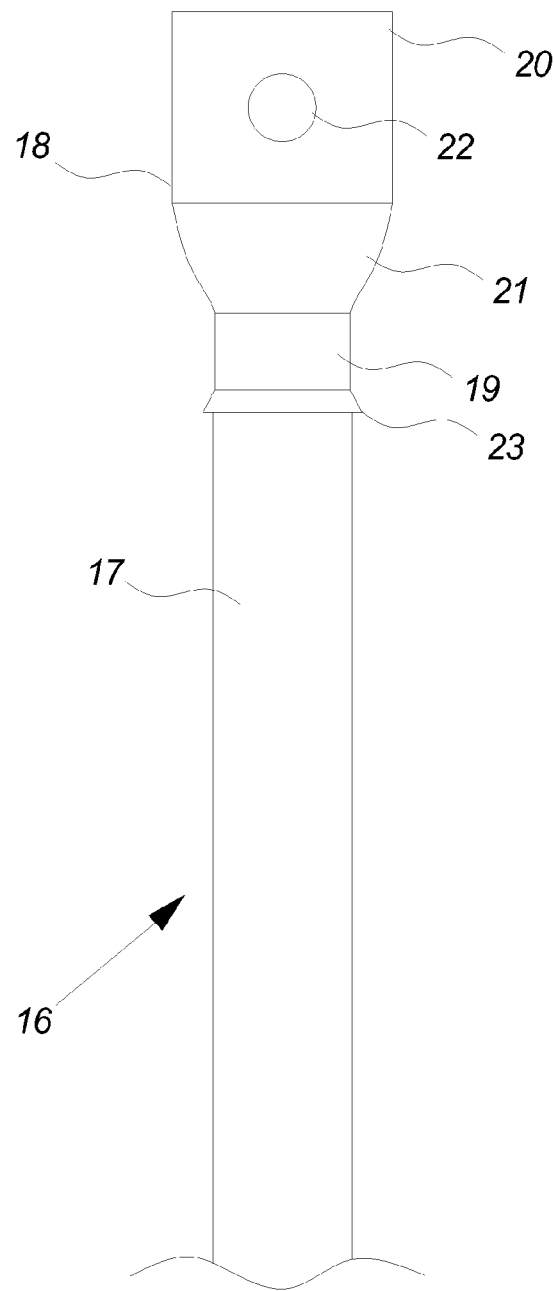

FIG. 4a and 4b illustrate two side views of a preferred embodiment of a flexible electric power cable 14 according to the invention.

FIG. 4a illustrates one end of the power cable with a cable shoe attached as a connection piece 18 allowing a connection between one end of the cable and an apparatus e.g. as the abovementioned. The opposite end of the cable may also have a connection piece 18 attached or connected by other connection means.

The connection piece 18 comprises an initial round shape in a mechanical connection area 19 which transforms into a four-sided shape in an electric connection area 20 through an adapting section 21. The electric connection area comprises a connection hole 22.

The connection piece 18 also comprises a bend out and trumpet shaped protective cap 23 at the beginning of the mechanical connection area 19 ensuring that the conductor 16 is not damaged by rubbing against the edge of the connection piece.

Figure 5A:
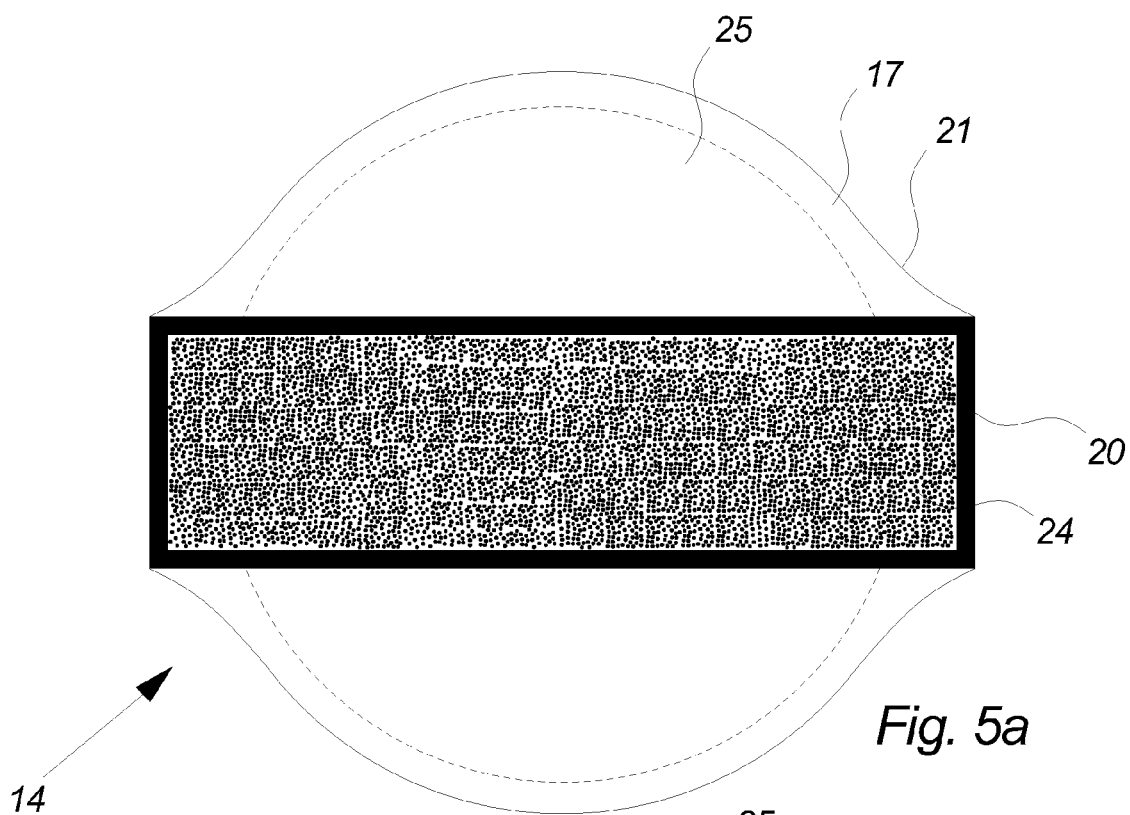
FIGS. 5a and 5b illustrate a preferred embodiment of a flexible electric power cable according to the invention seen from above and below.
Figure 5B:
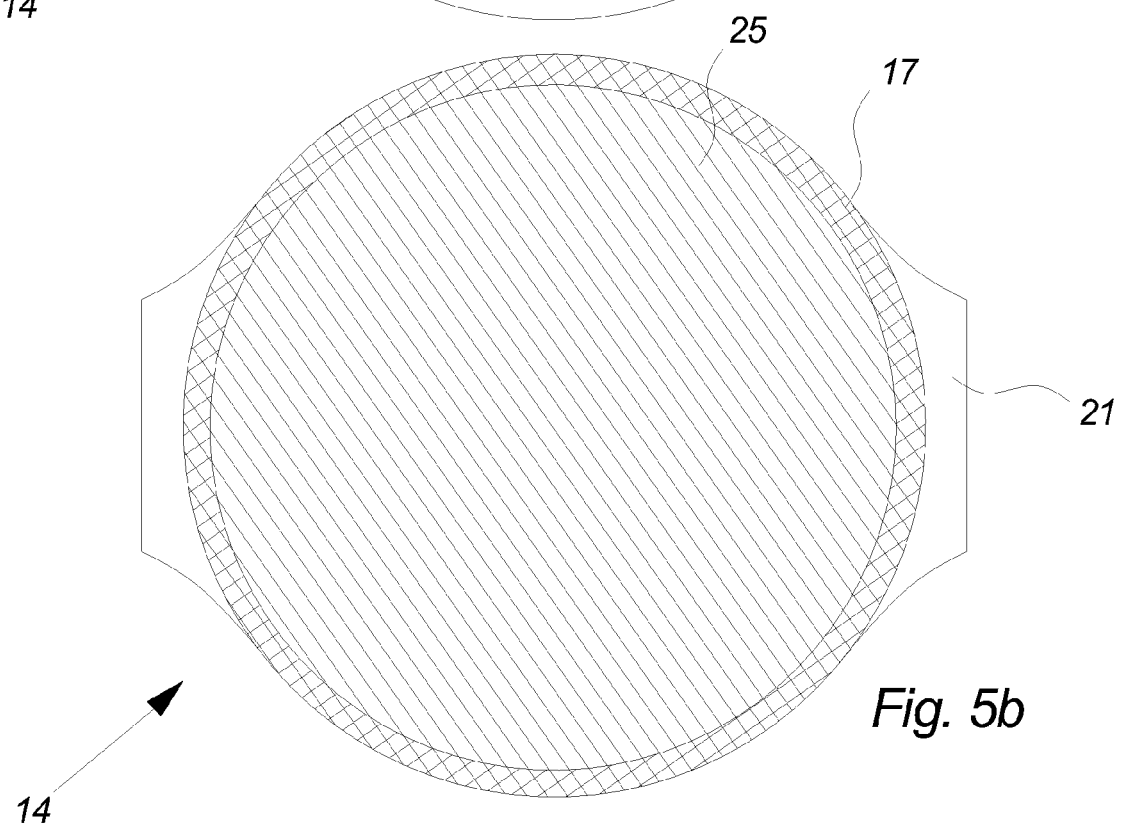

FIG. 5a and 5b illustrate a preferred embodiment of a flexible electric power cable according to the invention seen from above and below.

FIG. 5a illustrates the cable as seen from above and into the core ends 24 at the front of the electric connection area 20. Further, the adapting section 21 is illustrated as it transforms the circular shape of the conductor 16 and mechanical area into the four sided shape of the electric connection area 20. Even further, the isolator 17 of the conductor it is illustrated with dotted lines.

FIG. 5b illustrates the cable as seen from below and into the isolator 17 and the plurality of cores 25 of the conductor 16 as well as the adapting section 21.

Figure 6:
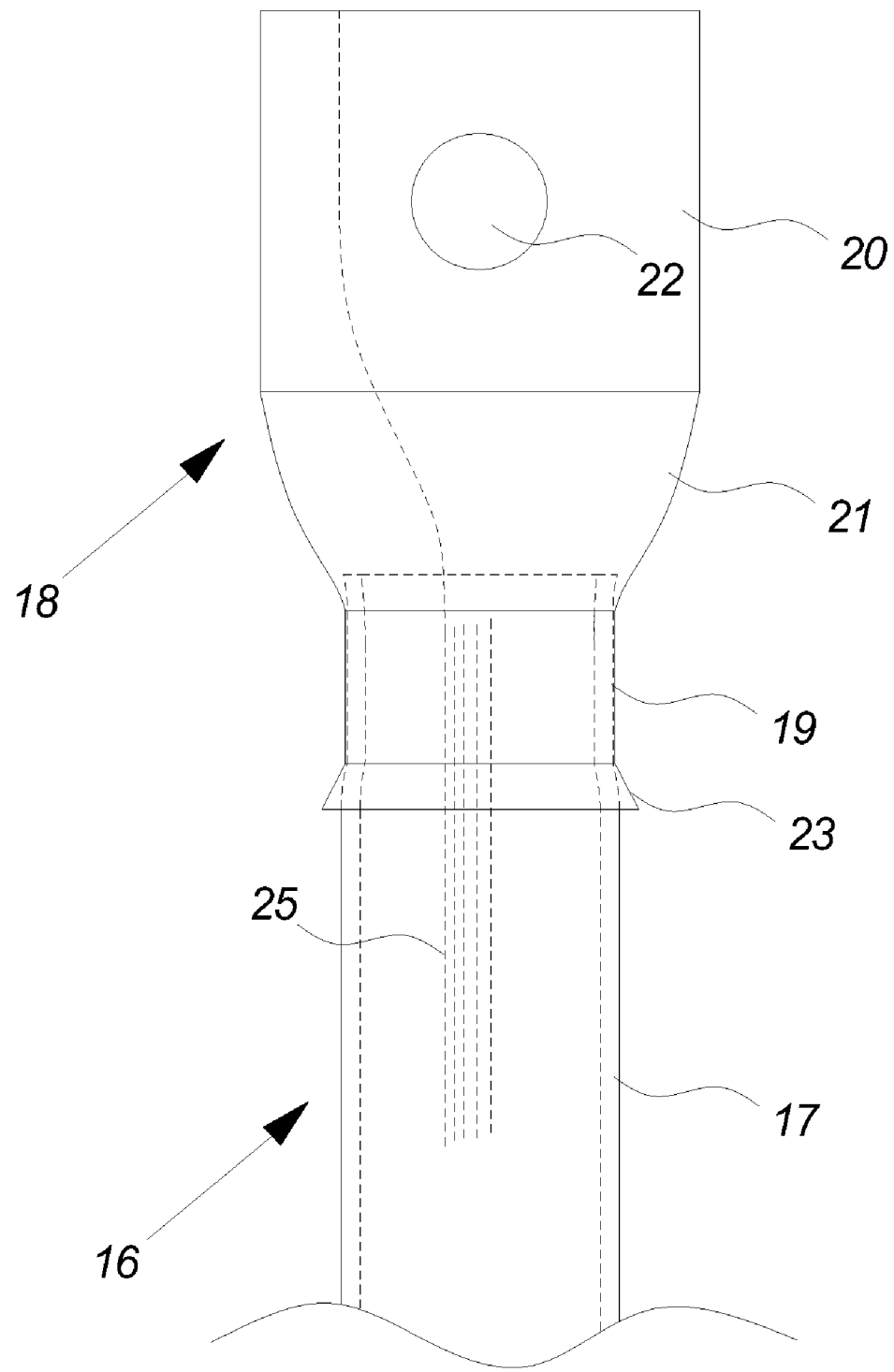
FIG. 6 illustrates schematically the content of a flexible electric power cable according to the invention.

FIG. 6 illustrates schematically the content of a flexible electric power cable according to the invention as seen from the side.

The circular shaped conductor 16 is illustrated with the moulded isolator 17 and with a few of the cores 25 as dotted lines. The isolator stretches through the mechanical area 19 and partly into the adapting section 21. The mechanical area 19 is circularly forced against the conductor with a tool in order to hold the circular shaped conductor in a tight and waterproof grip. The plurality of cores (illustrated with just one core) continues after the termination of the isolator in the adapting section into the electric connection area 20 and on both sides of the connection hole 22. The electric connection area 20 is forced by a tool into four sided shape in order to hold the cores in a tight grip and establish a secure electric connection.

The front of the electric connection area 20 may be sealed if necessary with melded zinc or similar metal material poured in between the core ends in order to make the electric connection area waterproof.

In a preferred embodiment of the invention, the flexible cable is a single insulated silicone (halogen free) copper cable with a cross section of 50 mm$^2$ and an outer diameter of approx. 15.5 millimetres. The single core diameter is 0.1 millimetres and the silicone isolator material has a thickness of 2.5 millimetres.

The length of the connector piece is preferably at least twice the diameter of the conductor in order to perform the transition e.g. a length of more than 30 millimetres for the electric and mechanical connection areas and the adapting section in relation to the outer diameter of approx. 15.5 millimetres for the conductor.

The invention described has been exemplified above with reference to specific examples of the cable. However, it should be understood that the invention is not limited to the particular examples but may be designed and altered in a multitude of varieties within the scope of the invention as specified in the claims e.g. in material use and sizes in order to establish a flexible electric power cable for a given application. Places of use may be many others beyond the rotating parts of a wind turbine such as different applications within the robot area.

What is claimed is:

1. A flexible electric power cable for transferring electric power in a moving environment, said power cable comprising
   a conductor with a plurality of cores for conducting an electric current and an isolator for protecting the conductor,
   a connector piece for surrounding and connecting an end of said conductor with one or more apparatuses, wherein said connector piece comprises at least two connection areas including
- one or more electrical connection areas establishing electrical connection between the connector piece and said plurality of cores and
- one or more mechanical connection areas establishing mechanical connection between the connector piece and the conductor, wherein said connection areas further are positioned in continuation of each other and separated, and wherein cross sections of said one or more mechanical connection areas and cross sections of said one or more electrical connection areas are of different shapes with one or more adapting sections connecting said mechanical connection areas and said electrical connection areas, tightly surrounding the cable all the way between said connection areas.

2. The flexible electric power cable according to claim 1 wherein said electrical connection areas comprise one or more through-going connection holes for connecting said connector piece to said one or more apparatuses.

3. The flexible electric power cable according to claim 2 wherein said one or more connection holes perforate the cores of the power cable.

4. The flexible electric power cable according to claim 1 wherein said isolator continues all the way through at least one mechanical connection area.

5. The flexible electric power cable according to claim 1 wherein said isolator is made of an insulating moulding material with said plurality of cores being moulded into the material.

6. The flexible electric power cable according to claim 1 wherein said plurality of cores and the isolator establish a circular cross section of said conductor.

7. The flexible electric power cable according to claim 1 wherein a cross section of a mechanical connection area is of a circular shape and a cross section of an electrical connection area is of a substantially four-sided shape.

8. The flexible electric power cable according to claim 7 wherein an adapting section has a circular shape corresponding to the shape of a mechanical connection area at one end and a four-sided shape corresponding to the shape of an electrical connection area at the other end.

9. The flexible electric power cable according to claim 1 wherein the core diameter is less than 0.5 millimeters.

10. The flexible electric power cable according to claim 1 wherein the cross section of the cable is more than 20 square millimeters.

11. The flexible electric power cable according to claim 1 wherein a front of the electrical connection area is sealed with an electrically conductive metal material.

12. The flexible electric power cable according to claim 1 wherein the mechanical connection area toward the conductor starts with a trumpet shaped protective cap.

13. The flexible electric power cable according to claim 1 wherein at least one of the mechanical connection areas and the electrical connection areas are established by a crimping process.

14. The flexible electric power cable according to claim 1 wherein a mechanical connection area, an electrical connection area and an adapting section are manufactured as one integral unit constituting a casing tightly surrounding the cable all the way through the connector piece.

15. A wind turbine comprising
- a stationary part including a wind turbine tower and nacelle
- a rotating part including a wind turbine rotor and hub
- wherein at least one flexible electric power cable according to claim 1 connects wind turbine apparatus in the rotating part in order to transfer electric power.

16. The wind turbine according to claim 15 wherein said flexible electric power cable is part of lightning protection or pitch control systems as positioned in the wind turbine hub.

17. The wind turbine according to claim 15 wherein said flexible electric power cable is free hanging beyond the connections at one or more connection pieces.

* * * * *